United States Patent [19]
Miller

[11] 3,806,693
[45] Apr. 23, 1974

[54] REPAIR-WELDING OF HEAT EXCHANGER TUBE SHEETS

[75] Inventor: Alan H. Miller, Philadelphia, Pa.

[73] Assignee: DeLaval Turbine Inc., Trenton, N.J.

[22] Filed: Mar. 17, 1972

[21] Appl. No.: 235,646

[52] U.S. Cl. .................. 219/121 EB, 219/125 R
[51] Int. Cl. ............................................ B23k 15/00
[58] Field of Search... 219/121 EB, 121 EM, 125 R, 219/125 TP; 250/49.5 R, 49.5 TE

[56] References Cited
UNITED STATES PATENTS

| 3,424,891 | 1/1969 | Anderson et al. | 219/121 EB |
| 3,621,182 | 11/1971 | Peyrot | 219/125 R |
| 3,513,286 | 5/1970 | Puls | 219/125 R |
| 3,384,734 | 5/1968 | Jakobsson | 219/125 R |
| 3,536,886 | 10/1970 | Juelg et al. | 219/125 R |
| 3,406,752 | 10/1968 | Lion | 219/121 EB X |
| 3,454,740 | 7/1969 | Foulguier et al. | 219/121 EB |

Primary Examiner—J. V. Truhe
Assistant Examiner—G. R. Peterson
Attorney, Agent, or Firm—Smith, Harding, Earley & Follmer

[57] ABSTRACT

Repair inserts for damaged heat exchanger tube sheets are welded in place by the use of an electron-beam welding gun, the beam of which is moved so that the point of impingement of the beam on the work moves in a circular path. The beam is first directed through an opening in the outer tube sheet in order to weld an insert in an opening in the inner tube sheet. Subsequently, the beam is used to weld an insert in an opening in the outer tube sheet. The electron beam produces a high-penetration weld in a single pass with a narrow fusion and heat-affected zone, and thus eliminates any need for post-weld heat treatment.

4 Claims, 5 Drawing Figures

3,806,693

3,806,693

REPAIR-WELDING OF HEAT EXCHANGER TUBE SHEETS

BRIEF SUMMARY OF THE INVENTION

This invention relates to the repair welding of heat exchangers or condensers of the kind used in steam power plants.

A heat exchanger typically consists of a shell in which there are located a large number of parallel tubes for carrying cooling liquid. Steam entering the shell condenses on the tubes.

At both ends of the heat exchanger, the tubes are held by a tube sheet assembly which separates the steam-containing shell interior from the head, through which cooling liquid passes to and from the interiors of the tubes.

The tube sheet assembly may comprise a single tube sheet at each end of the shell. In many cases, however, two tube sheets are provided at each end of the shell. At the end of the shell the two tube sheets are provided with aligned openings in which the tubes are held. The tubes extend through the inner tube sheet and terminate at the outside of the outer tube sheet. The space between the sheets is known as a steam leakoff chamber, and is normally evacuated during operation of the power plant.

The tubes of a heat exchanger are periodically replaced. When the old tubes are pulled, damage often occurs to the tube sheets, in which case it is necessary to effect a weld repair to the damaged hole in the tube sheet.

Repair is effected by drilling out the damaged holes and welding inserts into them. The inserts are generally cylindrical in shape. The inner passage of the insert conforms to the outside of a tube, while the outer surface of an insert conforms to the drilled out hole in which it is placed. The tube is secured to the outer tube sheet by rolling.

Welding of repair inserts has been accomplished in the past by the use of a tungsten-inert gas welding gun. One of the difficulties in the use of the tungsten-inert gas welding gun was the poor penetration of the weld which it produced.

In the case of double tube sheets, it is difficult to reach the inner tube sheet and therefore difficult to make an accurate weld with a tungsten-inert gas welding gun. Furthermore, the tungsten-inert gas method produces a relatively wide fusion and heat-affected zone and therefore requires a post-weld heat treatment.

In accordance with this invention, repair inserts are welded in place by an electron beam welding gun of the type described in U.S. Pat. No. 3,165,619, issued Jan. 12, 1965 to J. H. Cohen.

In the welding of an insert in the inner tube sheet, the electron beam passes through the aligned opening in the outer tube sheet. A special assembly moves the electron gun so that the point of impingement of the beam on the work travels in a circular path. The beam thus produces a very accurate weld on the inner tube sheet.

Preferably, the opening in the outer tube sheet is larger than the aligned opening in the inner tube sheet, and the electron beam gun assembly is arranged to move the beam in a cylindrical path of adjustable radius. For welding an insert into the inner tube sheet, the beam travels in a cylindrical path of relatively small diameter so that it clears the opening in the outer tube sheet. In welding an insert in the outer tube sheet, the beam travels in a cylindrical path having a relatively large diameter.

The primary object of this invention is to provide a method for rapid and trouble-free repair of tube sheets, and especially double tube sheets.

Another object is to provide a welding apparatus especially adapted for rapid and trouble-free welding of repair inserts in double tube sheets.

Other objects include the production of strong, deep-penetration welds and the elimination of the necessity for post-weld heat treatment.

Still further objects of the invention and details of the apparatus and welding procedure in accordance with the invention will be apparent from the following detailed description when read in conjunction with the drawings.

DETAILED DESCRIPTION

Figure 1:
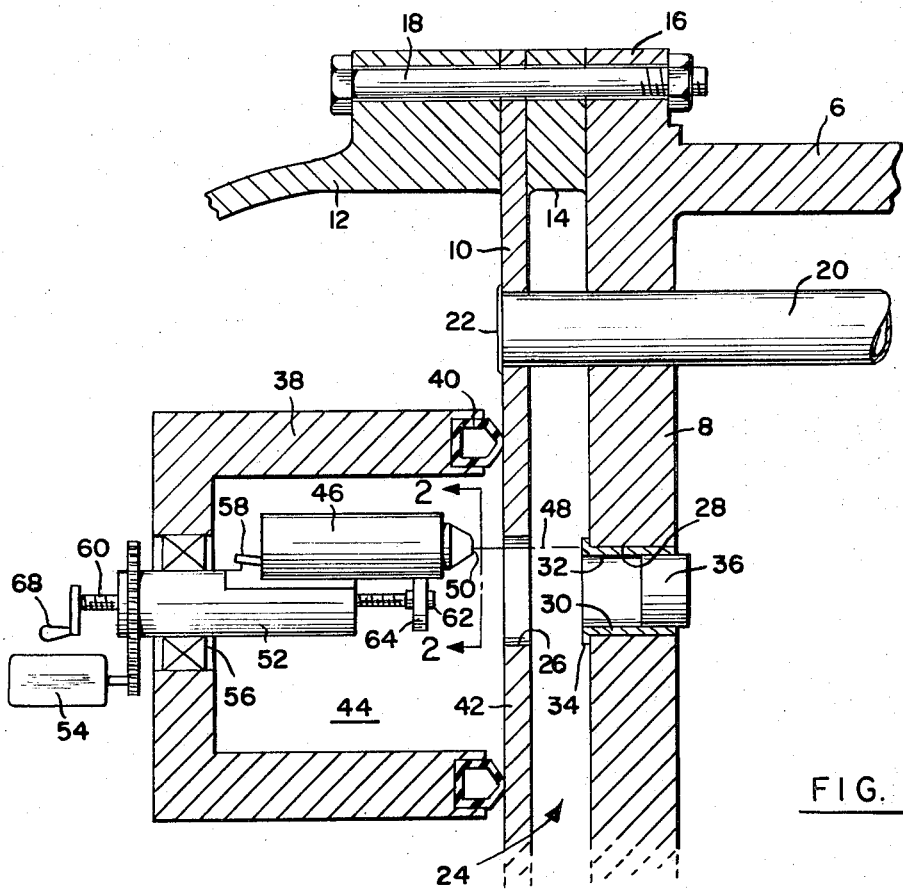
FIG. 1 is a longitudinal cross-section taken through a tube sheet assembly at the end of a heat exchanger and through a welding apparatus in accordance with the invention.

FIG. 1 shows a small portion of the heat exchanger near one end of condenser shell 6. An inner tube sheet is indicated at 8, and an outer tube sheet is indicated at 10. Head 12, outer tube sheet 10, spacer 14 and flange 16 of the condenser shell are held together by bolts, one of which is shown at 18. Tube 20 is an originally installed tube. It extends through tube sheets 8 and 10, and is secured to the outer tube sheet by rolling. Its opening 22 communicates with the cooling liquid chamber enclosed by head 12.

A steam leakoff chamber, between the inner and outer tube sheets, is indicated at 24. This chamber is normally evacuated during operation so that any steam escaping from the interior of shell 6 through a leak in tube sheet 8 is carried off by the vacuum pump and prevented from leaking through tube sheet 10.

FIG. 1 shows an opening 26 in tube sheet 10 and an opening 28 in tube sheet 8. Openings 26 and 28 are in the form of coaxial circular cylinders. These openings are formed by drilling out openings which have been damaged by the removal of a tube previously installed in them. Opening 26 is preferably larger in diameter than opening 28.

A metal insert 30 is shown in place in opening 28. Insert 30 has a cylindrical bore 32 which is of such a diameter that the new tube will fit in it tightly. The insert provides the filler metal for the welding process. It has a flange 34 at its outer end to prevent its being inserted too far into opening 28. A cylindrical metal plug 36 fits into the inner end of insert 32 to prevent the escape of air into space 24 from the interior of the shell when a vacuum is drawn during the welding process.

The welding apparatus comprises enclosure 38 which is provided with an inflated rubber seal 40 which is disposed in a loop, the entire circumference of which is in contact with the outer surface 42 of tube sheet 10.

During welding, a vacuum is drawn by the same pump which normally evacuates space 24 during operation of the power plant. During welding, the pump evacuates not only space 24, but also space 44 within enclosure 38.

Within space 44 is a conventional electron gun 46 comprising an emitting cathode and associate accelerating electrodes and magnetic focusing means. The interior of the gun is held under high vacuum conditions by a diffusion pump (not shown). It emits a beam indicated at 48 through an orifice at 50.

Gun 46 is mounted on a shaft 52 which is rotatably driven by motor 54 through gearing. Shaft 52 extends through packing 56 which is necessary to maintain space 44 in an evacuated condition.

Figure 2:
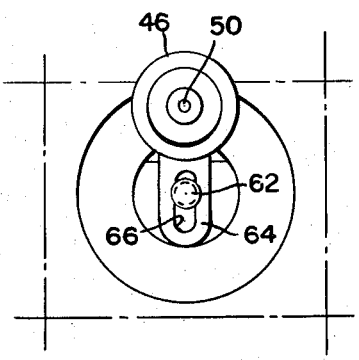
FIG. 2 is an end view of the electron gun and the assembly for rotating it, as viewed through the plane 2—2 indicated in FIG. 1.
Figure 5:
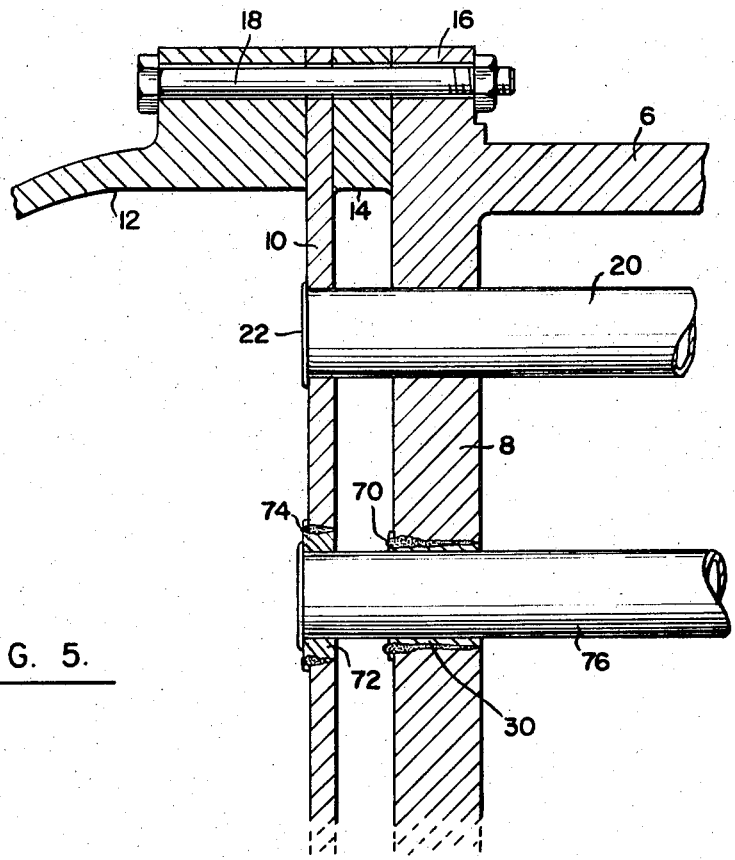
FIG. 5 is a sectional view showing a double tube sheet assembly with a repair completed.

Gun 46 is slidably mounted on an inclined track 58. Track 58 preferably has a T-shaped cross-section as does an inclined slot in the gun which engages the track. Screw 60 extends through shaft 52 and is threaded therein. At the right-hand end of screw 60, a spool-like member 62 (see also FIG. 2) engages yoke 64. Yoke 64 is attached to gun 46 and has a vertically extending slot 66 in which the narrow part of spool 62 rides. Screw 60 can be rotated by crank 68 to extend or withdraw the spool-like member 62 with respect to shaft 52. Gun 46 can thus be moved along track 58 to adjust the radial distance of the beam from the axis of rotation of shaft 52. The beam, however, is maintained in parallel with the axis of shaft 52 so that it describes a cylinder when shaft 52 is rotated.

As the gun moves radially with respect to the axis of shaft 52, it also moves longitudinally. The slope of the track is preferably such that the focal point of the beam substantially coincides with the point of impingement of the beam on the work. Thus, with the gun positioned as shown in FIG. 1, the beam is focused at approximately the location of the outer surface of tube sheet 8. When the gun is moved radially outwardly for welding of an insert of opening 26, the beam is focused approximately at surface 42 of tube sheet 10.

The first step in the repair procedure is to remove the defective tube and to drill out the openings in the tube sheet to an oversized condition to allow inserts to be installed. Referring to FIG. 1, it will be seen that opening 26 in the outer tube sheet has been drilled to a larger diameter than that of opening 28. The reason for this is to allow clearance for flange 34 and also to provide clearance for the welding beam so that it can pass through opening 26 during the welding of an insert in inner tube sheet 8.

Next, insert 30, with plug 36 in place, is inserted through opening 26 and installed in opening 28. It may be necessary to plug other openings which would otherwise allow air to flow into space 24. This would be necessary, for example, in the event that multiple tubes are removed prior to welding.

The next step is to set the welding assembly in place with the axis of shaft 52 aligned with the common axes of cylindrical openings 26 and 28. After a vacuum is drawn in spaces 24 and 44 and the welding gun 46 is adjusted to the proper position by means of screw 60, welding can commence. Because the electron beam gun produces a deep-penetration weld, insert 30 can be welded in place with a single pass of the welding gun, i.e. a single 360° rotation of shaft 52.

Figure 3:
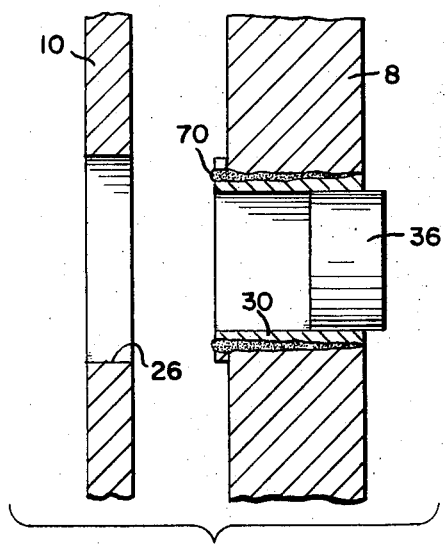
FIG. 3 is a sectional view taken through inner and outer tube sheets showing a completed weld in the inner tube sheet.

FIG. 3 shows insert 30 welded in place. The weld, indicated at 70, is very narrow, and its penetration into tube sheet 8 is 100 percent.

Figure 4:
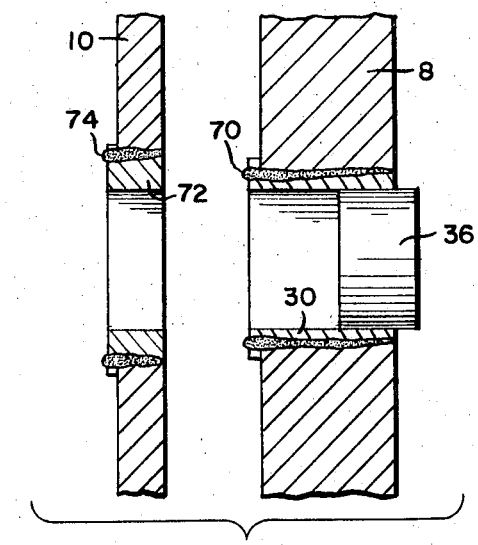
FIG. 4 is a sectional view taken through inner and outer tube sheets, showing completed welds in both tube sheets.

Insert 72 (FIG. 4) is then positioned in opening 26. Insert 72 has the same internal diameter as insert 30. However, its external diameter is larger. During the welding of insert 72, plug 36 remains in place in order to maintain the vacuum. The radial distance of the beam from the axis of rotation of shaft 52 is increased, and a 100 percent penetration weld is produced at 74 as shown in FIG. 4.

Finally, plug 36 is pushed out of insert 30, and tube 76 is inserted and secured to the outer tube sheet by rolling.

In order to effect a proper weld, it is necessary to prepare the tube sheet surfaces by removing embedded scale, iron oxide and other foreign materials detrimental to the welding operation.

It is also necessary to provide the oversized holes in the tube sheets with smooth surfaces. Preferably, water soluble lubricants are used for drilling out these holes.

Prior to placement of the inserts, the inner surfaces of the tube sheet holes and the outer surfaces of the inserts must be thoroughly cleaned with a solvent, and care must be taken to insure that the inserts are free of scale and oxide that may have formed during standing. Prior to welding, it is desirable to insure the absence of foreign material by blowing dry nitrogen on the ends of the inserts and around each hole of the tube sheet in which the inserts are to be placed.

In repair welding a tube sheet, it is desirable to stagger the location of the holes to be welded in order to minimize distortion of the tube sheet.

The apparatus for and the method of welding described herein allow damaged tube sheets to be repaired and provide a secure, deep-penetration weld in a single welding pass. The heat-affected zone is narrow so that no post-weld heat treatment is necessary.

While the preferred apparatus described produces a beam which moves in a cylindrical path, the distance of which from the axis of rotation is adjustable, it will be apparent that alternative schemes may be used for effecting impingement of the electron beam on the work in a circular path which may be adapted for welding either the inner or the outer tube sheet. It will be apparent to one skilled in the art that various other modifications can be made without departing from the scope of the invention as defined in the following claims.

I claim:

1. Electron beam welding apparatus for welding repair inserts in double tube sheets comprising:
   an enclosure;
   means within the enclosure for producing an electron beam;
   means, comprising a rotatable shaft, for moving the axis of the beam in a cylindrical path;
   a track fixed to the shaft and inclined with respect to the direction of the axis of rotation of the shaft, the means for producing an electron beam being mounted for movement along the track and oriented so that the direction of the beam is parallel to the axis of rotation of the shaft; and means for moving the electron beam producing means along said track for interdependent radial and axial movement thereof;

said track being inclined in a direction such that the means for producing an electron beam moves axially toward the work as the radius of the cylindrical path decreases.

2. Electron beam welding apparatus for welding repair inserts in double tube sheets comprising:

an enclosure;

means within the enclosure for producing an electron beam;

means, comprising a rotatable shaft for moving the axis of the beam in a cylindrical path, said electron beam producing means being mounted on said shaft and oriented so that the beam produced thereby is parallel to the axis of rotation of the shaft;

means for constraining said electron beam producing means for interdependent radial and axial movement thereof so that said electron beam producing means moves radially inwardly as the beam producing means moves axially toward the work, and moves radially outwardly as the beam producing means moves axially away from the work; and manually actuable control means accessible from the exterior of said enclosure and mechanically connected to said beam producing means for controlling the axial position thereof.

3. Apparatus according to claim 2 in which the rotatable shaft has an internal passage extending axially therethrough, and in which the manually actuable control means comprises a shaft extending through said passage and mechanically connected to the beam-producing means.

4. Apparatus according to claim 2 in which the rotatable shaft has a threaded internal passage extending axially therethrough, and in which the manually actuable control means comprises a threaded shaft extending through said passage, the threads of the shaft being in mating engagement with the threads of the passage, and said threaded shaft being mechanically connected to the beam-producing means.

* * * * *